United States Patent
Ghukasyan et al.

(10) Patent No.: US 7,174,341 B2
(45) Date of Patent: Feb. 6, 2007

(54) DYNAMIC DATABASE MANAGEMENT SYSTEM AND METHOD

(75) Inventors: Hovhannes Ghukasyan, Mountain View, CA (US); Suren Chilingaryan, Yerevan (AM); Yervant D. Lepejian, Palo Alto, CA (US)

(73) Assignee: Synopsys, Inc., Mountain View, CA (US)

( * ) Notice: Subject to any disclaimer, the term of this patent is extended or adjusted under 35 U.S.C. 154(b) by 353 days.

(21) Appl. No.: 09/871,485

(22) Filed: May 31, 2001

(65) Prior Publication Data

US 2002/0184228 A1 Dec. 5, 2002

(51) Int. Cl.
*G06F 7/00* (2006.01)

(52) U.S. Cl. .............. 707/102; 707/1; 707/2; 707/100; 707/200

(58) Field of Classification Search ........... 707/200, 707/3, 2, 4, 103 Y, 1, 100, 102
See application file for complete search history.

(56) References Cited

U.S. PATENT DOCUMENTS

| | | | |
|---|---|---|---|
| 5,809,495 A * | 9/1998 | Loaiza | 707/2 |
| 5,835,757 A | 11/1998 | Oulid-Aissa et al. | 395/610 |
| 5,950,190 A | 9/1999 | Yeager et al. | 707/3 |
| 6,016,497 A * | 1/2000 | Suver | 707/103 R |
| 6,018,742 A * | 1/2000 | Herbert, III | 707/102 |
| 6,094,649 A | 7/2000 | Bowen et al. | 707/3 |
| 6,189,012 B1 * | 2/2001 | Mital et al. | 707/103 R |
| 6,427,143 B1 * | 7/2002 | Isip et al. | 707/1 |
| 6,438,547 B1 * | 8/2002 | Mehr et al. | 707/7 |

\* cited by examiner

*Primary Examiner*—Tim Vo
*Assistant Examiner*—Hung Pham
(74) *Attorney, Agent, or Firm*—Bever, Hoffman & Harms, LLP; Patrick T. Bever (57) ABSTRACT

A dynamic database management system includes a data dictionary, a data importer and a query front-end. The data importer automatically imports data from an input file into a database, while adding new tables for new attributes as necessary, and updating parameters and folders tables in the data dictionary accordingly, so that end-users may access the imported data by database queries through the query front-end.

10 Claims, 9 Drawing Sheets

RefGroup

| RefGroupID | RefGroupName | |
|---|---|---|
| 1 | DeviceAttr | 602 |
| 2 | LotAttr | 603 |
| 3 | WaferAttr | 604 |
| 4 | DieET | 605 |
| 5 | DefectSizeData | 606 |
| 6 | DefectData | 607 |
| 7 | DefectClassData | 608 |

References

| RefName | RefGroupID | RefTable | IDField | NameField | |
|---|---|---|---|---|---|
| Device | 1 | Device | DeviceID | DeviceName | 702 |
| Lot | 2 | Lot | LotID | LotName | 703 |
| Wafer | 3 | Wafer | WaferID | WaferName | 704 |
| Die | 4 | Die | DieID | DieXY | 705 |
| Wafer | 4 | Wafer | WaferID | WaferName | 706 |
| Wafer | 5 | Wafer | WaferID | WaferName | 707 |
| Step | 5 | Step | StepID | StepName | 708 |
| SizeBin | 5 | SizeBin | SizeBinID | SizeBinRange | 709 |
| Wafer | 6 | Wafer | WaferID | WaferName | 710 |
| Step | 6 | Step | StepID | StepName | 711 |
| Wafer | 7 | Wafer | WaferID | WaferName | 712 |
| DefectClass | 7 | DefectClass | DefectClassID | DefectClassName | 713 |

Parameters

| ParamID | ParamName | ParamType | ParamDefinition | RefGroupID | |
|---|---|---|---|---|---|
| 1 | Det1 | Numeric | DieET.Det1 | 4 | ~801 |
| 2 | Dsd1 | Numeric | DefectSizeData.Dsd1 | 5 | ~802 |
| 3 | Dd1 | Numeric | DefectData.Dd1 | 6 | ~803 |
| 4 | Dcd1 | Numeric | DefectClassData.Dcd1 | 7 | ~804 |
| 5 | Dcd2 | Numeric | DefectClassData.Dcd2 | 7 | ~805 |

<p style="text-align:right">~806</p>

FIG. 8

Folders

| FolderID | FolderName | Parent | |
|---|---|---|---|
| 1 | DieET | 0 | ~901 |
| 2 | DefectSizeData | 0 | ~902 |
| 3 | DefectData | 0 | ~903 |
| 4 | DefectClassData | 0 | ~904 |

<p style="text-align:right">~905</p>

FIG. 9

ParamFolders

| FolderID | ParamID | |
|---|---|---|
| 1 | 1 | ~1001 |
| 2 | 2 | ~1002 |
| 3 | 3 | ~1003 |
| 4 | 4 | ~1004 |
| 4 | 5 | ~1005 |

<p style="text-align:right">~1006</p>

FIG. 10

Input File
RefGroup=DefectClassData

| Wafer | DefectClass | Dcd1 | Dcd2 | Dcd3 | |
|-------|-------------|------|------|------|---|
| 1 | 1 | 1 | 2 | 3 | ~1101 ~1102 |
| 1 | 2 | 4 | 5 | 6 | ~1103 |
| 1 | 3 | 7 | 8 | 9 | ~1104 |

FIG.11

Parameters

| ParamID | ParamName | ParamType | ParamDefinition | RefGroupID | |
|---------|-----------|-----------|-----------------|------------|---|
| | | | | | ~801 |
| 6 | Dcd3 | Numeric | DCData1.Dcd3 | 7 | ~1201 |

FIG.12

Folders

| FolderID | FolderName | Parent | |
|----------|------------|--------|---|
| | | | ~901 |
| 5 | New Parameters | 0 | ~1301 |
| 6 | DefectClassData | 0 | ~1302 |

FIG.13

ParamFolders

| FolderID | ParamID | |
|----------|---------|---|
| | | ~1001 |
| 6 | 6 | ~1401 |

DYNAMIC DATABASE MANAGEMENT SYSTEM AND METHOD

FIELD OF THE INVENTION

The present invention generally relates to techniques for managing modifications to databases and in particular, to a dynamic database management system and method.

BACKGROUND OF THE INVENTION

One of the most important features of a database is that it provides a certain degree of isolation between its data structures and software that uses them. Unfortunately, this degree of isolation is often low in the real world, especially in cases where the system architecture is not specifically designed to support future modifications to the database schema. In such cases, expensive software modifications that effectively drop the system's usability to zero may result.

The most common and simplest example of a database modification is adding an attribute to a table. Even this simple example, however, normally requires: altering the table design to add the attribute, and modifying the front-end software so that it gives users access to the new attribute (unless the attribute names are retrieved from the database and they are self-explanatory). In a more complex example, the new attribute may belong to a relationship that does not exist in the database. In this case, the modifications will involve creation of a new table and significant changes to the software to make use of the newly created table.

Although certain conventional approaches generally work fine for adding or deleting attributes of objects or existing relationships without modifying the software that uses the database, they generally do not support transparent adding of a new attribute if the table representing the relationship does not already exist in the database.

OBJECTS AND SUMMARY OF THE INVENTION

Accordingly, an object of the present invention is to provide a dynamic database management system and method.

Another object of the present invention is to provide a dynamic database management system and method that automatically imports data associated with new attributes into a database.

Another object of the present invention is to provide a dynamic database management system and method that automatically imports data associated with new attributes into a database, and makes them immediately available to end-users or computer programs using the database.

Still another object of the present invention is to provide a dynamic database management system and method that automatically imports data associated with new attributes into a database by creating new tables as necessary, and makes the imported data immediately available to end-users or computer programs using the database.

These and additional objects are accomplished by the various aspects of the present invention, wherein briefly stated, one aspect is a dynamic database management system comprising: a data dictionary including identifications of related groups of tables in a database, information of tables in the related groups, and identifications of parameters of the related groups; and a data importer receiving an input including data to be imported into the database, an indication of one of the related groups that is associated with the data, and indications of parameters associated with the data, wherein the data importer appends one or more portions of the data associated with existing parameters to corresponding one or more existing tables associated with the existing parameters and having tables of the indicated one of the related groups as references, appends data associated with new parameters to a new table created for the new parameters, and updates the data dictionary to include the identifications and information of the new table and new parameters.

In another aspect, a method for managing a dynamic database comprises: receiving an input including data to be imported into a database, an indication of a related group of tables that is associated with the data, and indications of parameters associated with the data; forming a set of existing parameters and a set of new parameters from the parameters associated with the data, based upon parameter information stored in a data dictionary for the related group of tables; appending one or more portions of the data associated with the set of existing parameters to corresponding one or more existing tables in the database and having tables of the related group as references; importing a remaining portion of the data associated with the set of new parameters to a new table created for the new parameters; and updating information in the data dictionary to include identifications and information of the new table and the new parameters.

Additional objects, features and advantages of the various aspects of the invention will become apparent from the following description of its preferred embodiments, which description should be taken in conjunction with the accompanying drawings.

DETAILED DESCRIPTION OF THE PREFERRED EMBODIMENT

Figure 1:
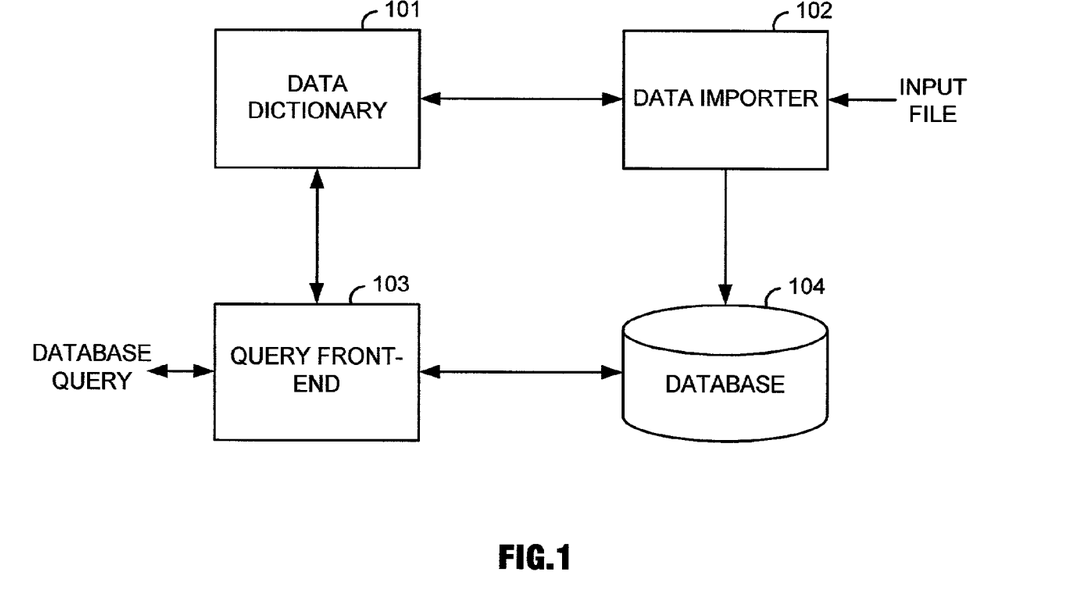
FIG. 1 illustrates, as an example, a block diagram of a dynamic database management system, utilizing aspects of the present invention.

FIG. 1 illustrates, as an example, a block diagram of a dynamic database management system designed to support databases subject to frequent schema modifications. Included in the system are a data dictionary 101, a data importer 102 and a query front-end 103. Together, these modules provide the ability to automatically import data included in an input file and associated with new attributes not previously included in the data dictionary 101 to a database 104, and make the data available to end-users for database queries through the query front-end 103. The modules may be implemented in any one of several well-known ways, including software, firmware, hard-wired logic, or combinations thereof, in conjunction with a processor as appropriate.

The data dictionary 101 stores metadata including table relationship information and attribute locations. The data importer 102 writes data into the database 104 based on the information stored in the data dictionary 101, and updates the data dictionary as necessary after such writing. The query front-end 103 presents the database 104 to end-users in the form of a parameter tree with user-defined folders and items that correspond to the table attributes. Usage of the parameter tree as a user front-end addresses two issues. First, the end-user works with the names that are familiar to him or her, organized into a custom folder structure adopted to the domain and/or usage of the data instead of dealing with the database directly, where the naming and organization of the data can be quite cryptic to the ordinary end-user. Second, the dynamically added parameters are immediately made available to the end-user and can be then moved to the appropriate folders by the database administrator or other authorized user.

Figure 2:
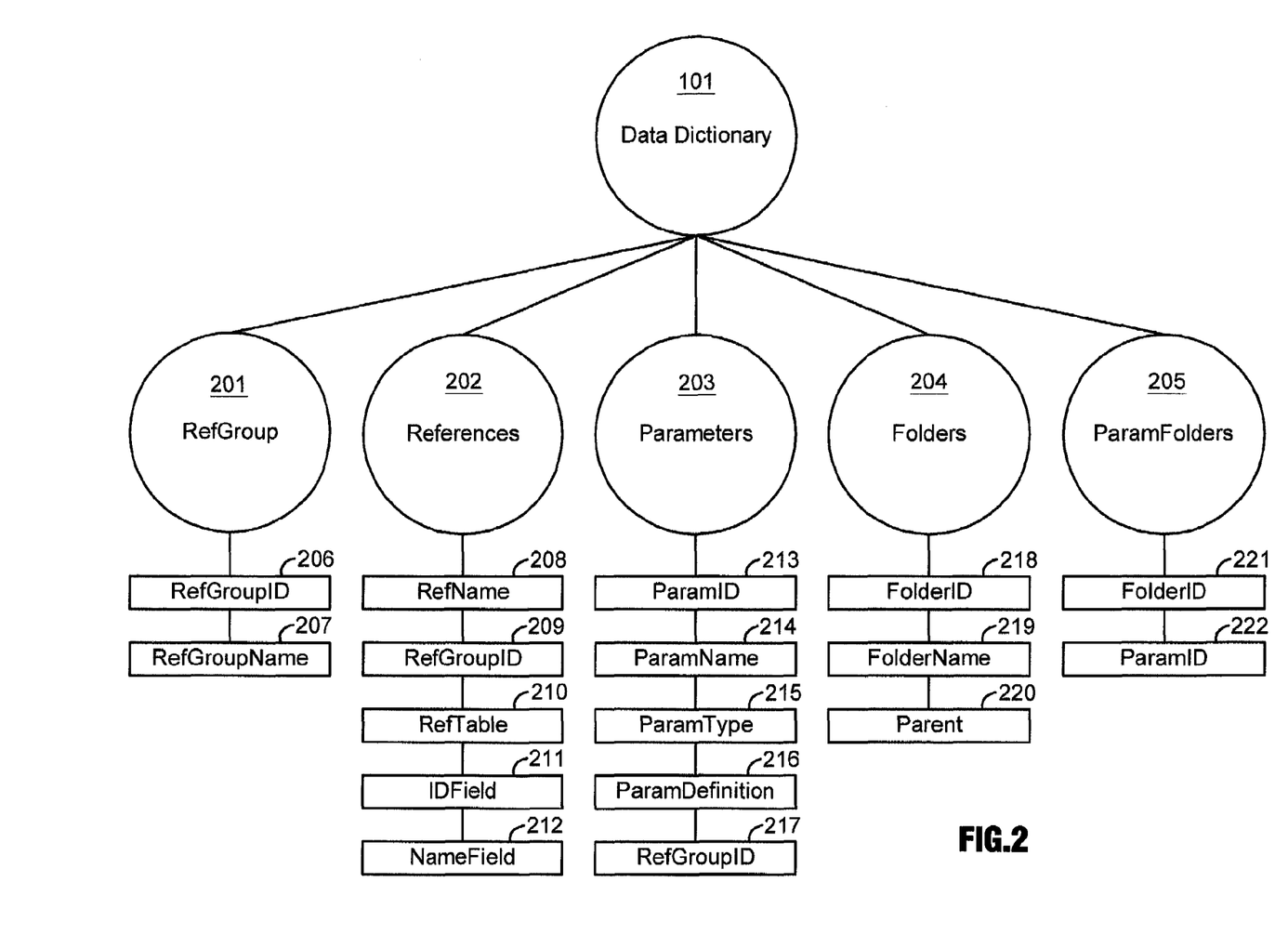
FIG. 2 illustrates, as an example, a structure diagram for a data dictionary, utilizing aspects of the present invention.

FIG. 2 illustrates, as an example, a diagram detailing the structure of the data dictionary 101. A RefGroup table 201 contains a record per object or table relationship, and has columns RefGroupID 206 and RefGroupName 207. Objects or table relationships in this system are allowed to have detached attributes. A References table 202 contains names of the reference tables and fields that should be used to link to the detached attributes of a given object or table relationship. The References table 202 has columns RefName 208, RefGroupID 209, RefTable 210, IDField 211 and NameField 212. A Parameters table 203 contains names of data items that are used in the Query Front-End 103, and their types and definitions. Definitions are stored in the form TableName.FieldName. This table has columns ParamID 213, ParamName 214, ParamType 215, ParamDefinition 216, and RefGrouptID 217. Records in the RefGroup table 201, References table 202 and Parameters table 203 are linked through their RefGroupID fields, 206, 209 and 217, respectively. A Folders table 204 contains information of user-defined folders used in the Query Front-End 103. This table has columns FolderID 218, FolderName 219 and Parent 220. Folders are displayed to the end-user in a parameter tree fashion. A ParamFolders table 205 provides the necessary information for parameter-to-folder mapping. This table contains columns FolderID 221 and ParamID 222.

Figure 3:
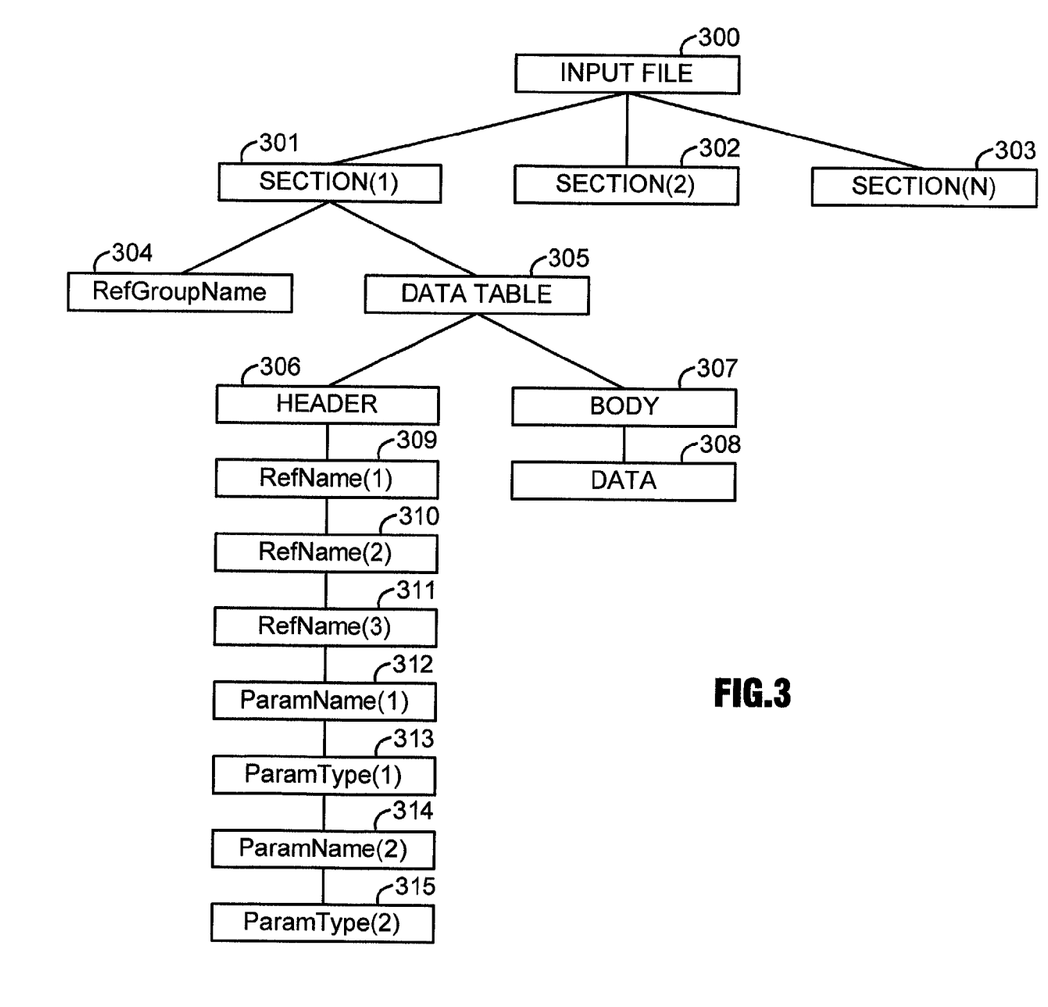
FIG. 3 illustrates, as an example, a structure diagram for an input file, utilizing aspects of the present invention.

FIG. 3 illustrates, as an example, a diagram detailing the structure of an input file 300. The input file 300 contains one or more sections such as sections 301, 302 and 303. Each section, such as exemplified by section 301, contains a RefGroupName field 304 for providing the name of the reference group to which the enclosed data belongs, and a data table 305. The name provided in the RefGroupName field 304 should match one of the reference group names provided in the RefGroupName column 207 of the RefGroup table 201 in the Data Dictionary 101. The data table 305 contains a header portion 306 and a body portion 307. The header portion 306 includes the names of references, such as RefName(1) 309, RefName(2) 310 and RefName(3) 311, from the References table 202 linked through the same RefGroupID to the reference group indicated in the RefGroupName field 304. The header portion 306 also contains at least one parameter name associated with the reference group accompanied by its data type, such as ParamName(1) 312 and ParamType(1) 313. The body portion 307 contains the data or values to be imported.

Figure 4:
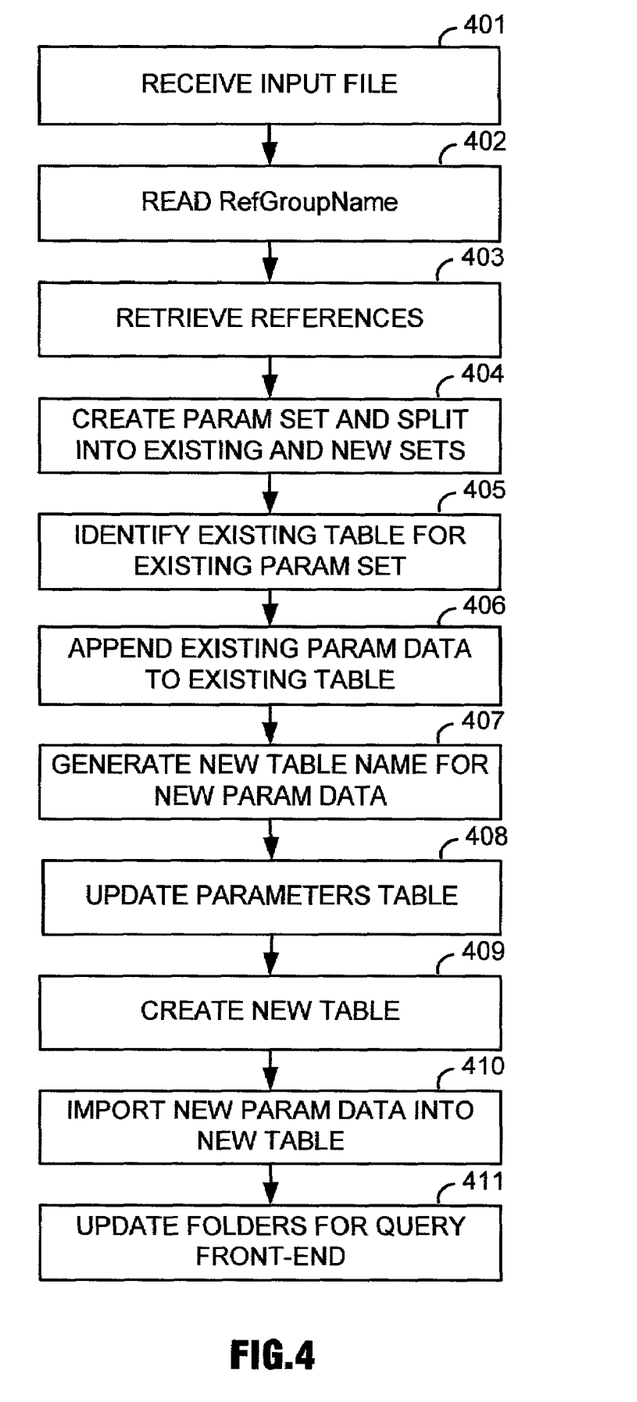
FIG. 4 illustrates, as an example, a flow diagram of a method for dynamic database management, utilizing aspects of the present invention.

FIG. 4 illustrates, as an example, a flow diagram of a method for dynamic database management performed by the data importer 102. In 401, an input file is received. The input file is then checked to make sure that its structure conforms to that described in reference to FIG. 3. Assuming it is valid, then in 402, the reference group name associated with the data to be imported is read from the RefGroupName field 304 of a section of the input file 300 being processed. In 403, references corresponding to the reference group name are then retrieved from the References table 202 of the Data Dictionary 101.

In 404, a parameters set is created from the retrieved references and column information in the data table 305 of the input file 300, and split into existing and new parameters sets based on the existence of parameters in the Parameters table 203 of the Data Dictionary 101. In 405, one or more existing tables for the existing parameters are then identified from information stored in the Parameters table 203 of the Data Dictionary 101. For example, if the existing parameter set is {x, y, z} and the Parameters table 203 discloses a table A having the indicated reference group as references and parameters x and y as attributes and another table B also having the indicated reference group as references and parameter z as an attribute, then tables A and B will be identified in this case as the one or more existing tables referred to above. In 406, data associated with the existing parameters are then imported into one or more temporary tables or files created to correspond to the one or more existing tables according to common existing parameters, and then the one or more temporary tables or fields are appended to their corresponding one or more existing tables. In 407, a new table name is created for the data associated with the new parameters. In 408, the Parameters table 203 of the Data Dictionary 101 is updated to include the new parameters and new table. In 409, the new table is created, and in 410, the data associated with the new parameters are imported into the new table. Finally, in 411, the Folders table 204 and ParamFolders table 205 are updated to respectively add a new folder for the new table and mapping information from the new table to the new parameters.

Figure 5:
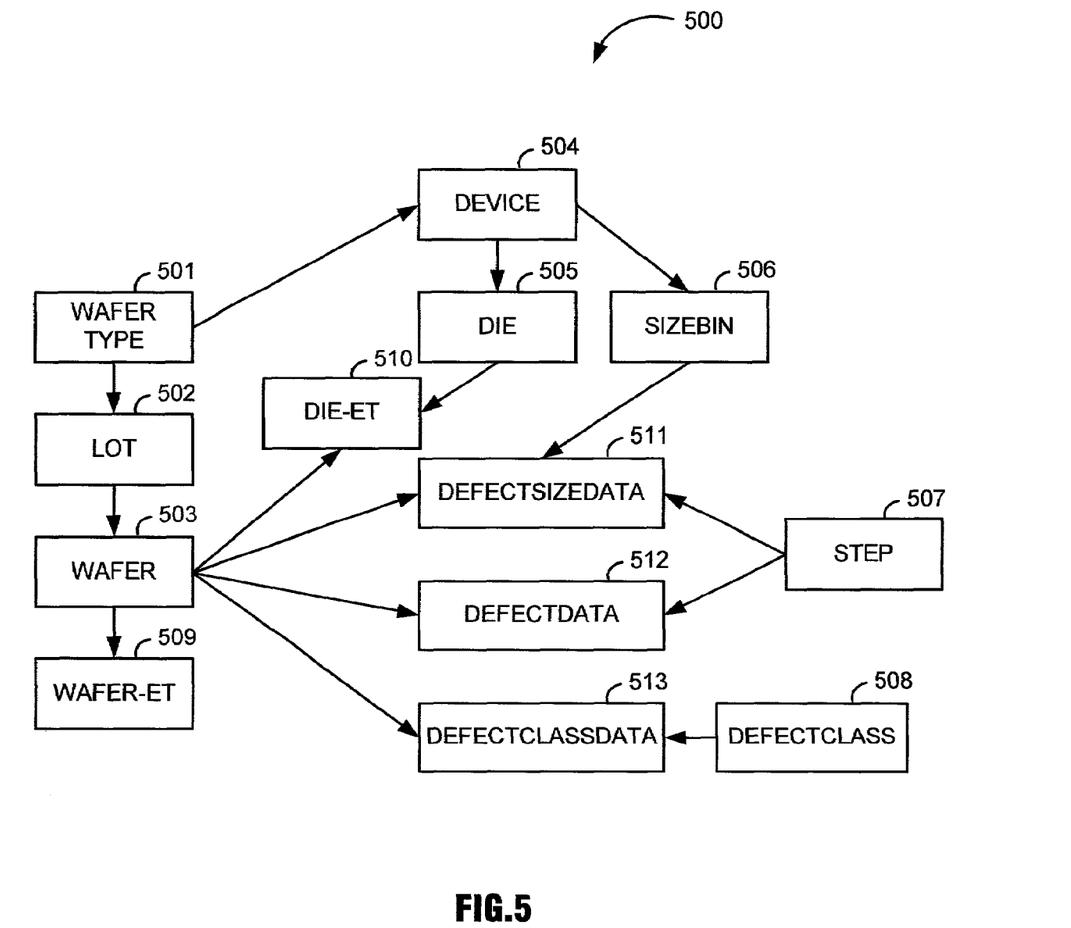
FIG. 5 illustrates, as an example, a dependency graph depicting relationships between tables for a database schema.
Figure 6:
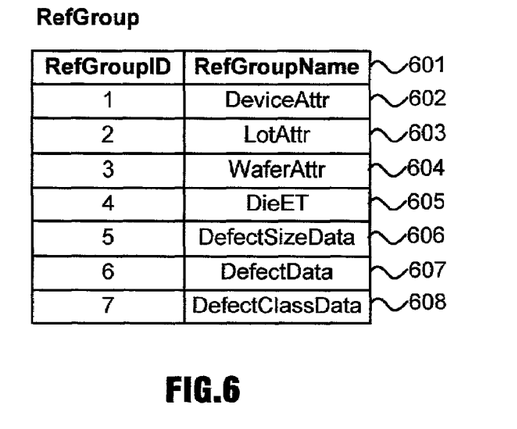
FIG. 6 illustrates, as an example, a reference group table in a data dictionary, utilizing aspects of the present invention.
Figure 11:
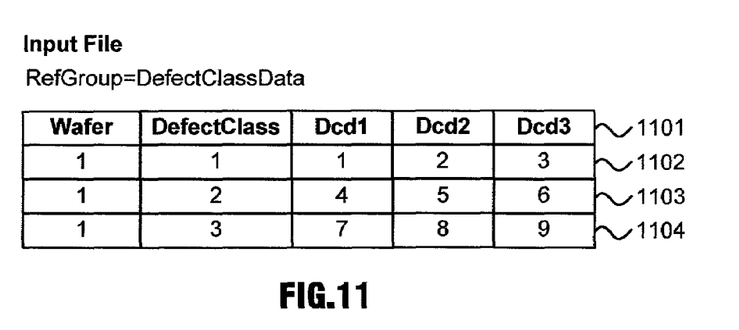
FIG. 11 illustrates, as an example, an input file to the database management system, utilizing aspects of the present invention.

A simple example is now described to further illustrate the dynamic database management system and method embodying the present invention. In FIG. 5, a dependency graph 500 is illustrated as depicting relationships between tables for a database schema, and tables in the data dictionary corresponding to the database schema are illustrated in FIGS. 6–10. In FIG. 11, an example of an input file to the database management system is illustrated.

Figure 7:
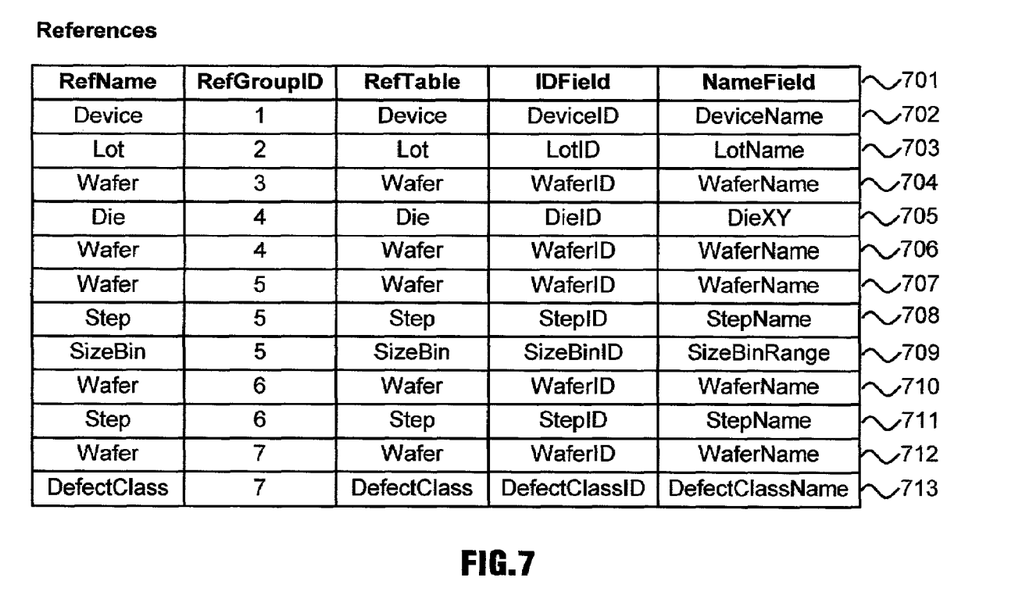
FIG. 7 illustrates, as an example, a references table in a data dictionary, utilizing aspects of the present invention.
Figure 8:
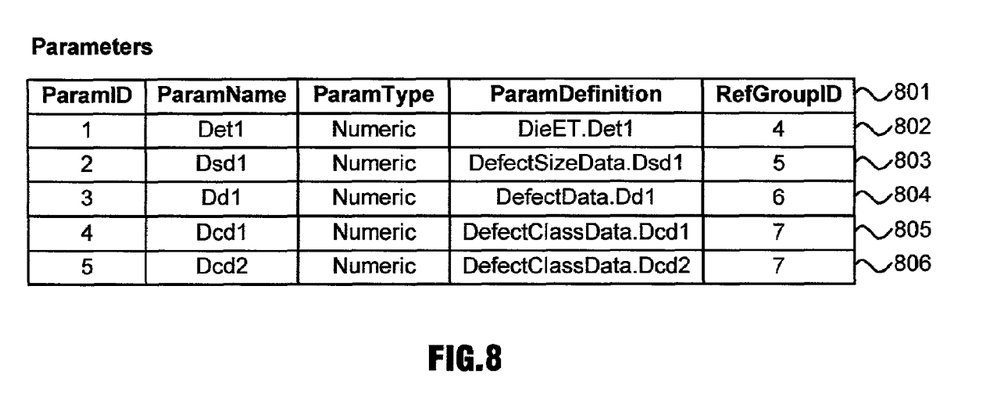
FIG. 8 illustrates, as an example, a parameters table in a data dictionary, utilizing aspects of the present invention.
Figure 9:
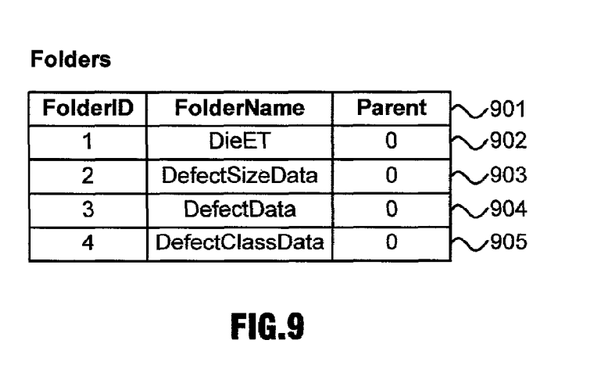
FIG. 9 illustrates, as an example, a folders table in a data dictionary, utilizing aspects of the present invention.
Figure 10:
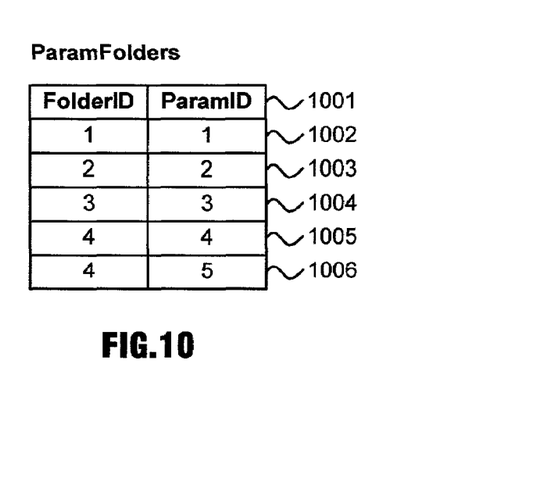
FIG. 10 illustrates, as an example, a parameter to folder mapping table in a data dictionary, utilizing aspects of the present invention.

According to the method described in reference to FIG. 4, after receiving the input file depicted in FIG. 11, the data importer 102 reads the reference group name from the RefGroupName field of the input file. In this example, the reference group is named DefectClassData. According to record 608 of the RefGroup table depicted in FIG. 6, the reference group named DefectClassData has a RefGroupID of "7". Based upon this value for RefGroupID, the data importer 102 then retrieves the reference names for the reference group from the References table, which according to records 712 and 713 of the References table depicted in FIG. 7, are "Wafer" and "DefectClass". This can also be readily seen from the dependency graph 500 of FIG. 5, wherein the directions of the arrows indicate that the table DEFECTCLASSDATA 513 is dependent upon reference tables WAFER 503 and DEFECTCLASS 508.

Defining R as the set of reference names for the references, then R={"Wafer", "DefectClass"}. Likewise, defining H as the set of columns from the input file, then H={"Wafer", "DefectClass", Dcd1, Dcd2, Dcd3} according to the input file depicted in FIG. 11.

A parameter set P may then be determined as P=H −R, which in this case is equal to {Dcd1, Dcd2, Dcd3}. This set is then split based on the Parameters table depicted in FIG. 8, into an existing parameter set, PE={Dcd1, Dcd2}, and a new parameter set PN={Dcd3}. As is evident from the ParamDefinition fields in records 805 and 806 in the Parameters table depicted in FIG. 8, both existing parameters, Dcd1 and Dcd2, are associated with the same table, DefectClassData. Accordingly, the data importer 102 creates a temporary table or file having columns R+PE ("Wafer", "DefectClass", Dcd1, Dcd2), stores data corresponding to the existing parameters from the input file to the temporary table, and appends the temporary table to the existing DefectClassData table having the same columns.

Figure 12:
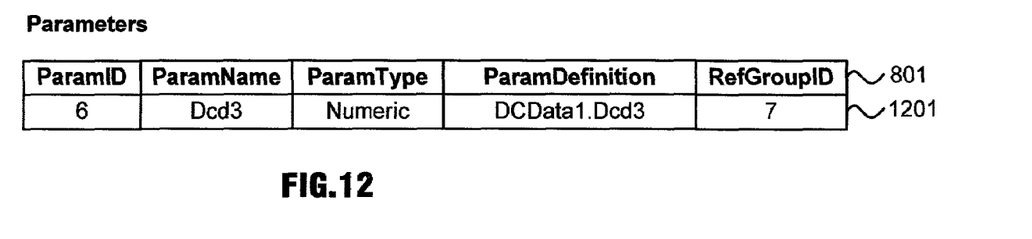
FIG. 12 illustrates, as an example, an update record to the parameters table, utilizing aspects of the present invention.

For the new parameter, Dcd3, the data importer 102 first generates a new table name, such as DCData1, and then creates a new record, such as record 1201 depicted in FIG. 12 for the new parameter, for inclusion in the Parameters table. The data importer 102 then creates the new table named DCData1 and having columns R+NE ("Wafer", "DefectClass", Dcd3), and imports data corresponding to the new parameters from the input file into the newly created table. The new table is then added to the dependency graph 500 by connecting an arrow pointing from the table WAFER 503 to the new table DCData1 and another arrow pointing from the table DEFECTCLASS 508 to the new table DCData1.

Figure 13:
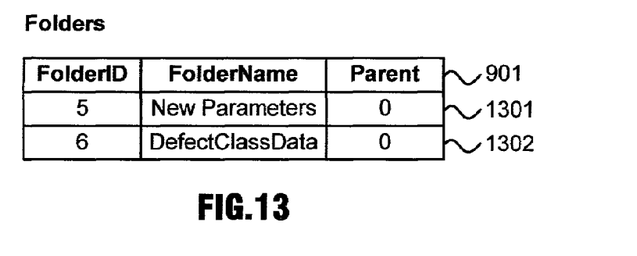
FIG. 13 illustrates, as an example, update records to the folders table, utilizing aspects of the present invention.
Figure 14:
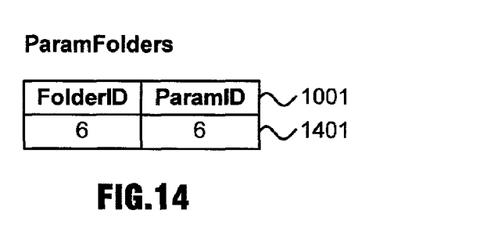
FIG. 14 illustrates, as an example, an update record to the parameter to folder mapping table, utilizing aspects of the present invention.
Figure 15:
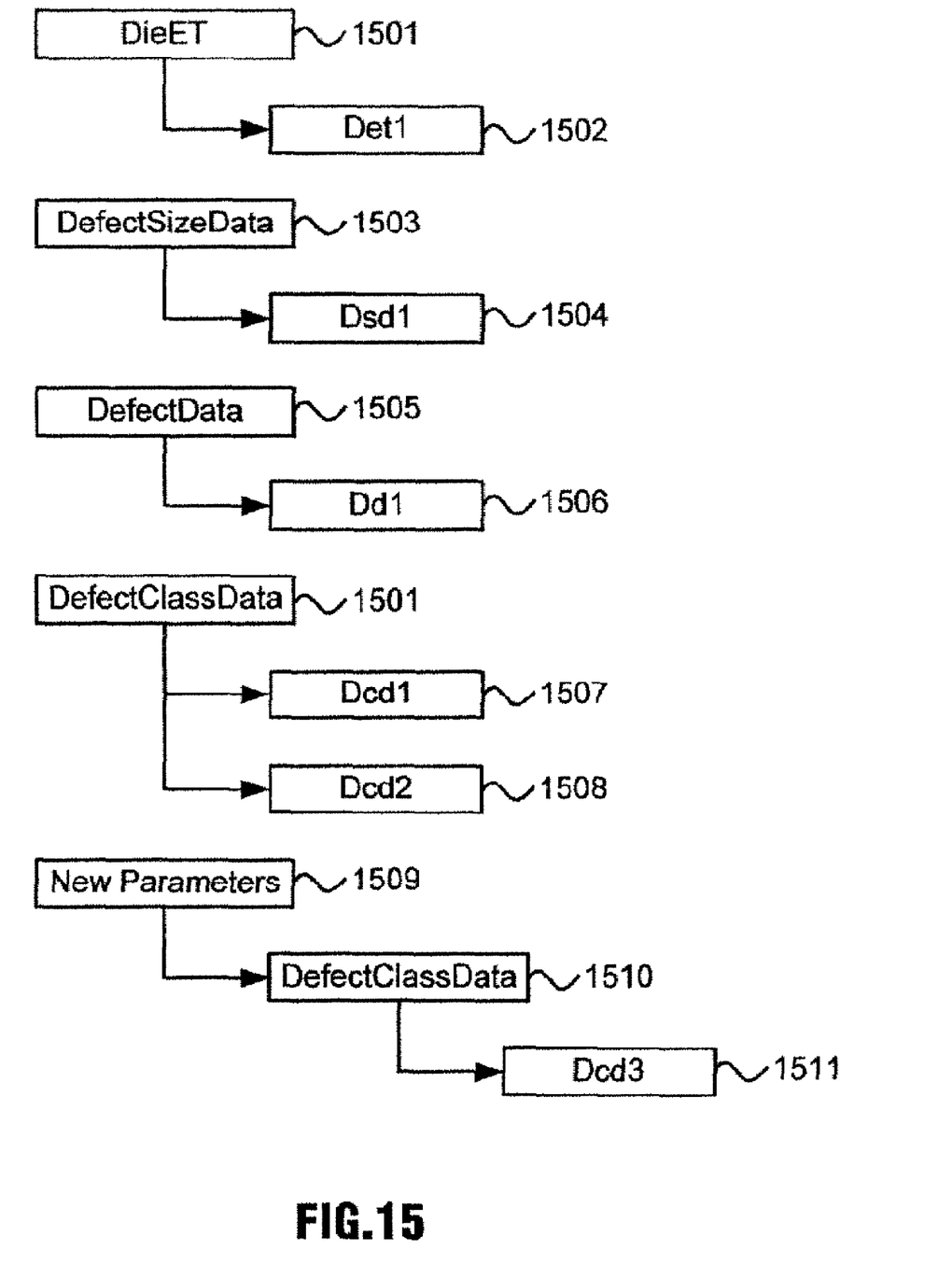
FIG. 15 illustrates, as an example, the parameter tree resulting from the database management system, utilizing aspects of the present invention, processing the input file of FIG. 11.

Finally, to make the data available to end-users, the data importer 102 creates new folders named "New Parameters" and "DefectClassData" as depicted by records 1301 and 1302 in an update to the Folders table as depicted in FIG. 13, and associates the new parameter to the new folder "DefectClassData" as depicted by record 1401 in an update to the ParamFolders table as depicted in FIG. 14. The resulting parameter tree would then appear as depicted in FIG. 15, as presented to the end-user by the Query Front-End 103.

Next time the data importer 102 gets a similar input file, it will find from the Parameters table 203 that all three parameters, Dcd1, Dcd2 and Dcd3, exist in the database, but the first two, Dcd1 and Dcd2, are in the DefectClassData table and the last one, Dcd3, is in the DCData1 table. The data importer 102 will then split data from the input table into two sub-tables based on that split of the existing parameters, and append the first one to the DefectClassData table and the second one to the DCData1 table.

Although the various aspects of the present invention have been described with respect to a preferred embodiment, it will be understood that the invention is entitled to full protection within the full scope of the appended claims.

We claim:

1. A dynamic database management comprising:
a processor in conjunction with:
a data dictionary including identifications of related groups of tables in a database, information of tables in said related groups, and identifications of parameters of said related groups; and
a data importer receiving an input from an input file including data to be imported into said database, an indication of one of said related groups that is associated with said data, and parameters associated with said data,
wherein said data importer
forming a set of existing parameters and a set of new parameters from said parameters associated with said input data, based upon identification of parameter of said related groups stored in said data dictionary;
determines input data associated with said set of existing parameters, and input data associated with said set of new parameters;
appends one or more portions of said determined input data associated with said set of existing parameters to corresponding one or more existing tables associated with said set of existing parameters and having said related groups of tables as references;
creates a new table having said related groups of tables as references and fields corresponding to said new parameters;
imports said determined input data associated with new parameters to said created new table, and
updates said data dictionary to include said identifications and information of said new table and said new parameters, whereby said updated information includes identification of both of said one or more existing tables and said new table.

2. The system according to claim 1, further comprising:
a query front-end providing a parameter tree to be displayed to users for facilitating database queries,
wherein said data dictionary further includes information for said parameter tree, and said data importer further updates said information for said parameter tree to include information of said new table and new parameters.

3. The system according to claim 1, wherein said data dictionary has a reference groups table for storing indications of related groups of tables, and including columns for reference groups identifications and reference groups names.

4. The system according to claim 1, wherein said data dictionary has a references table for storing information of reference tables for individual of said related group of tables.

5. The system according to claim 1, wherein said data dictionary has a parameters table for storing information of parameters associated with individual of said related group of tables.

6. The system according to claim 2, wherein said data dictionary has a folders table for storing information of a parameter tree to be provided to said query front-end.

7. The system according to claim 6, wherein said data dictionary has a parameters table for storing information of parameters associated with individual of said related group of tables.

8. The system according to claim 7, wherein said data dictionary has a parameters-to-folders mapping table for mapping said information of parameters to corresponding information in said parameters-to-folders table.

9. A method for managing a dynamic database in a processing system, comprising:
    creating a data dictionary including identifications of related groups of tables in said dynamic database, information of tables in said related groups, and identifications of parameters of said related groups;
    receiving an input from an input file including data to be imported into said dynamic database, an indication of a related group of tables that is associated with said data, and parameters associated with said data;
    determining input data associated with existing parameters and data associated with new parameters;
    forming a set of existing parameters and a set of new parameters from said parameters associated with said input data, based upon identification of parameter of said related groups stored in created data dictionary;
    determining input data associated with said set of existing parameters and input data associated with said set of new parameters;
    appending said determined input data associated with said set of existing parameters to corresponding one or more existing tables having said related group of tables as references;
    creating a new table having said related groups of tables as references and fields corresponding to said set of new parameters;
    importing said determined input data associated with said set of new parameters to said created new table; and
    updating said data dictionary to include identifications and information of said new table and said new parameters, whereby said updated information includes identification of both of said one or more existing tables and said new table.

10. The method according to claim 9, further comprising identifying said one or more existing tables having said related group of tables as references in said database from information in said data dictionary linking said one or more existing tables to said existing parameters.

* * * * *